United States Patent
Champlin et al.

(10) Patent No.: US 6,519,635 B1
(45) Date of Patent: *Feb. 11, 2003

(54) SNMP MASTER AGENT THAT TRANSLATES MESSAGES TO A SUB-AGENT PROPRIETARY FORMAT USING A TRANSLATION TABLE BY THE SUB-AGENT

(75) Inventors: Michael Champlin, San Jose, CA (US); Mark Carroll, Saratoga, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,143

(22) Filed: Apr. 30, 1998

(51) Int. Cl.$^7$ .................... G06F 15/173; G06F 15/16
(52) U.S. Cl. ..................... 709/223; 709/230
(58) Field of Search ................. 709/230, 225, 709/226, 220, 217, 223–224; 707/4, 10, 103; 345/734–737

(56) References Cited

U.S. PATENT DOCUMENTS

| | | | | |
|---|---|---|---|---|
| 5,438,614 A | * | 8/1995 | Rozman et al. ............... 379/93 |
| 5,678,006 A | * | 10/1997 | Valizadeh et al. ........... 709/200 |
| 5,740,368 A | * | 4/1998 | Villalpando ................. 709/202 |
| 5,764,955 A | * | 6/1998 | Doolan ........................ 709/223 |
| 5,778,377 A | * | 7/1998 | Marlin et al. ................ 707/103 |
| 5,793,646 A | * | 8/1998 | Hibberd et al. .............. 364/505 |
| 5,951,649 A | * | 9/1999 | Dobbins et al. ............. 709/238 |
| 6,009,431 A | * | 12/1999 | Anger et al. .................. 707/10 |
| 6,018,567 A | * | 1/2000 | Dulman ..................... 379/32.03 |
| 6,044,407 A | * | 3/2000 | Jones et al. .................. 709/246 |
| 6,055,243 A | * | 4/2000 | Vincent ....................... 370/466 |
| 6,058,431 A | * | 5/2000 | Srisuresh et al. ........... 709/245 |
| 6,068,661 A | * | 5/2000 | Shari ............................ 703/27 |
| 6,076,107 A | * | 6/2000 | Chen et al. .................. 709/224 |
| 6,104,868 A | * | 8/2000 | Peters et al. ................. 709/202 |
| 6,122,639 A | * | 9/2000 | Babu et al. .................. 707/103 |
| 6,226,679 B1 | * | 5/2001 | Gupta .......................... 709/230 |
| 6,263,366 B1 | * | 7/2001 | Jacobs et al. ............... 709/223 |

OTHER PUBLICATIONS

Wijnen, B. et al., Simple Network Management Protocol Distributed Protocol Interface Version 2.0, RFC–1228, IETF, pp. 1–47, Mar. 1994.*
The Simple Times, vol. 4, No. 2, pp. 1–24, Apr. 1996.*
The Simple Times, vol. 6, No. 1, pp. 1–21, Mar. 1998.*
Daniele, M., et al., Agent Extensibility (AgentX) Protocol Version 1, RFC–2257, IETF, pp. 1–69, Jan. 1998.*
"The IEEE Standard Dictionary of Electrical and Electronics Terms," 6th ed. IEEE, pp. 169, 603, Dec. 1996.*

* cited by examiner

*Primary Examiner*—Andrew Caldwell
(74) *Attorney, Agent, or Firm*—Blakely, Sokoloff, Taylor & Zafman LLP

(57) ABSTRACT

A simple network management protocol (SNMP) manager communicates with an SNMP master agent using an SNMP data unit (PDU). The PDU includes identification data identifying a particular sub-agent and an SNMP command for an associated managed object. The master agent translates the PDU from the SNMP format into a proprietary database record format used by the sub-agent. The master agent translates the SNMP PDU into the proprietary database record format using a translation table provided by the sub-agent. Messages also flow from the sub-agent to the SNMP manager. The master agent translates these messages from the proprietary database record format into an SNMP PDU using the translation table.

22 Claims, 2 Drawing Sheets

SNMP MASTER AGENT THAT TRANSLATES MESSAGES TO A SUB-AGENT PROPRIETARY FORMAT USING A TRANSLATION TABLE BY THE SUB-AGENT

FIELD OF THE INVENTION

The present invention is related to simple network management protocol (SNMP) functions and, in particular, to a translation mechanism whereby SNMP protocol data units (PDUs) are converted to database records for use by SNMP agents.

BACKGROUND

The simple network management protocol (SNMP) is a network management standard protocol created, at least in part, under the guidance of the Internet Task Forces of the International Standards Organization. The SNMP operates within a network management system and is used to convey information about network elements among various "agents" in the system and a managing process. Within the SNMP hierarchy, the agents report to the managing process on the status of their respective managed network elements. In turn, the agents receive directions from the managing process on actions to perform on those network elements. A management information base (MIB) is used by the agents and the managing process to determine the structure and content of management information concerning the network elements. In other words, the MIB describes the managed network elements. The network elements may be represented by managed objects and may be hardware elements such as switches, private branch exchanges (PBXs), port carts within a switch or PBX, workstations, etc., or software elements such as queuing algorithms, buffer management routines, traffic policing routines, etc.

As illustrated in FIG. 1, within an SNMP framework, a managing system 10 directs the actions of a managed system 12. The managed system 12 includes a remote manager 14 in addition to a number of managed objects 16. The remote manager 14 generally includes an agent 18, called an SNMP master agent, which is responsible for receiving network management messages 20 from a managing process 22 associated with the managing system 10 and ensuring that proper access control measures are taken regarding the managed objects 16. The agent 18 may also be responsible for providing and controlling local logging operations and for making decisions about whether messages are to be returned to Managing process 22. The messages 20 which may be passed between the managing process 22 and the agent 18 (and those which may be returned by the agent 18) take the form of protocol data units (PDUs).

As discussed above, the managed objects 16 are representations of how a network resource can be managed by the management protocol; they are not "things" themselves. Instead, the managed objects 16 are abstractions of physical or logical network elements. Each managed object 16 can be described (defined) by attributes, which are characteristics or properties, at its interface; operations which can be performed on it; notifications or reports it is allowed to make; and its behavior in response to those operations. The attributes of each managed object 16 distinguish it from other managed objects within the network. Thus, the attributes describe the characteristics, current state, and operating conditions of the managed object 16. Associated with each attribute is an attribute value, e.g., a card in a switch may be described by an attribute called "status" which may have values of "operational" and "not operational". Thus, each attribute consists of a "type" and one or more values.

SNMP uses a relatively limited set of operations to perform its management functions. For example, "Gets" are used to retrieve information and "Sets" are used to modify information. Each Get request includes an identifier to distinguish it from other requests and to identify the network element about which information is requested. Gets are answered with a "Get Response" which includes an identifier to associate it with the appropriate Get request and the data requested thereby. Sets are used to describe an action to be performed on a network element, e.g., to change a value. In addition, "Traps" may be used to report unusual conditions or to change the status of a network element.

The management information base (MIB) is one of the most important components of the network management system because it identifies the network elements (i.e., it describes the managed objects 16) that are to be managed. The MIB also contains the unique identifiers (addresses) that are to be associated with each managed object 16. The MIB then, is a database that contains information about the managed objects 16. For example, the MIB may contain information about the number of cells or packets sent or received across an interface or the number of connections on a port card of a switch in the network. Further, the MIB contains information that describes each network management user's ability to access elements of the MIB. For example, one user may have read-only privileges, while another may have read-write privileges.

In general, network management protocols operate on the MIB, rather than directly on the managed objects 16. This level of abstraction allows the managed system 12 or managing system 10 to be ignorant of the database organization of a network element, because it operates only on the MIB, which represents the managed objects 16. The systems operate through the exchange of messages 20 in the form of PDUs and the MIB describes the contents and structure of the fields that must be included within the PDUs. For example, the MIB defines the type and value fields for the Get and Set messages which are passed. The important aspects of the MIB then, are that it defines the network elements that are managed, how the user accesses them and how they can be reported.

FIG. 2 illustrates a conventional method of implementing SNMP in a distributed network. Typically, an SNMP master agent 30, which is part of the managed system 12, is placed on a main processor system and various SNMP sub-agents 32, each with their associated MIBs 34, are placed on (a) secondary processor system(s). An SNMP manager 36 (which generally includes the managing process for the network) exchanges SNMP PDUs (e.g., which may include Get, Set and/or Get Response messages) 38 with the SNMP master agent 30, e.g., to provide control information for the SNMP master agent 30 or an SNMP sub-agent 32 associated therewith or to receive requested values of attributes.

The format of the SNMP PDUs is illustrated in FIG. 3. As shown, each SNMP PDU 38 is encapsulated in a packet 40 which generally comprises a header 42 (e.g., an internet protocol header), which allows for appropriate flow and traffic control and routing within the distributed network, and a CRC field 44, which allows for error checking. The SNMP PDU 38 may thus be regarded as a data packet which generally specifies the address 48 of the object to be controlled (e.g., the SNMP master agent 30 or an associated SNMP sub-agent 32) the desired command (e.g., a Set or Get command) 50 and an appropriate value (e.g., an attribute value for a network element) 52.

In conventional SNMP-controlled networks, the SNMP PDU 38 provided by the SNMP manager 36 to the SNMP master agent 30 must be parsed by the SNMP master agent 30 before it can be provided to an SNMP sub-agent 32. The parsing allows the SNMP master agent 30 to determine the appropriate SNMP sub-agent to receive the command 50 and to reformat the SNMP PDU 38 provided by the SNMP manager 36 to a format which can be recognized by the associated SNMP sub-agent 32. The SNMP master agent 30, upon completion of these operations, packages and transmits a further protocol data unit, referred to as an Agent PDU 54, to the appropriate SNMP sub-agent 32. Even where the command 50 is destined for a network element associated with the SNMP master agent 30, parsing operations are required to identify the address of the intended network object 16.

The Agent PDU 54 generally resembles the SNMP PDU 40 illustrated in FIG. 3 and comprises header and data fields. Again, the data field will generally specify the address of the managed object 16 to be controlled (e.g., in this case a network element associated with the SNMP sub-agent 32), a command and the appropriate value. Upon receipt of the Agent PDU 54, the SNMP sub-agent 32 must parse the Agent PDU 54, e.g., to determine which managed object is being addresses, and then service the associated command.

In addition, the SNMP sub-agent 32 is required to archive the various values associated with each of its managed objects 16 (e.g., as reflected in its associated MIB 34) to a database 56. These archived records may be read by the sub-agent 32 on a re-boot, e.g., to recover a previously stored configuration prior to a power loss or other restart event. The records are generally transferred to the database 56 using Database Record PDUs 58.

All of the parsing operations described above require significant processor overhead. Moreover, the parsing functions must be implemented at both the master agent and sub-agent level, requiring these agents to be relatively complex entities. It would be desirable to implement a network management scheme which avoids these drawbacks.

SUMMARY OF THE INVENTION

The present invention provides, in one embodiment, a method which includes receiving, in a first format, a simple network management protocol (SNMP) protocol data unit (PDU) having identification data for an SNMP sub-agent and an SNMP command. The method further includes translating the identification data for the SNMP sub-agent and the SNMP command from the first format to a second format. Further, the identification data and command may be transmitted, in the second format, to the SNMP sub-agent. When received by the SNMP sub-agent, the command may invoke a response.

In a further embodiment, a method is provided wherein information data for an SNMP sub-agent and an SNMP command, each received in the first format as part of an SNMP protocol data unit, is translated from a first format to a second format. The translation may comprise a look-up operation wherein a translation table is accessed.

In yet another embodiment, a network includes a translation table configured to translate SNMP PDUs to database records for use by SNMP agents. The translation table may be stored by an SNMP master agent associated with a managed network which includes the SNMP agents.

These and other features and advantages provided by the present invention will become apparent from a review of the detailed description and its accompanying drawings which follow.

BRIEF DESCRIPTION OF THE DRAWINGS

The present invention is illustrated by way of example, and not limitation, in the figures of the accompanying drawings in which.

DETAILED DESCRIPTION

Described herein is a simple network management protocol (SNMP) protocol data unit (PDU) translation mechanism. The SNMP PDU translation mechanism allows for the receipt, in a first format, of an SNMP PDU having identification data for an SNMP sub-agent and an SNMP command. The mechanism further allows for translating the identification data for the SNMP sub-agent and the SNMP command from the first format to a second format. Thus translated, the identification data and command may be transmitted, in the second format, to the SNMP sub-agent.

The mechanism further provides a method which includes translating information data for an SNMP sub-agent and an SNMP command, each received in a first format, e.g. as part of an SNMP PDU, from the first format to a second format. The translation operation may comprise accessing a look-up table or other translation table. The translation table may include, in one embodiment, an ordered sequence of registers that are associated with one or more SNMP sub-agents, or processors associated therewith.

Figure 1:
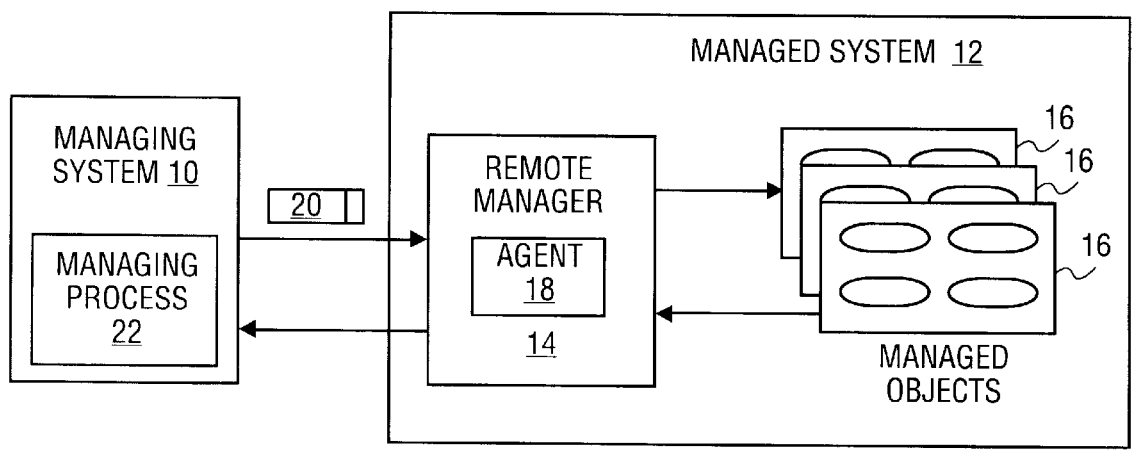
FIG. 1 illustrates a conventional simple network management protocol (SNMP) hierarchy.
Figure 2:
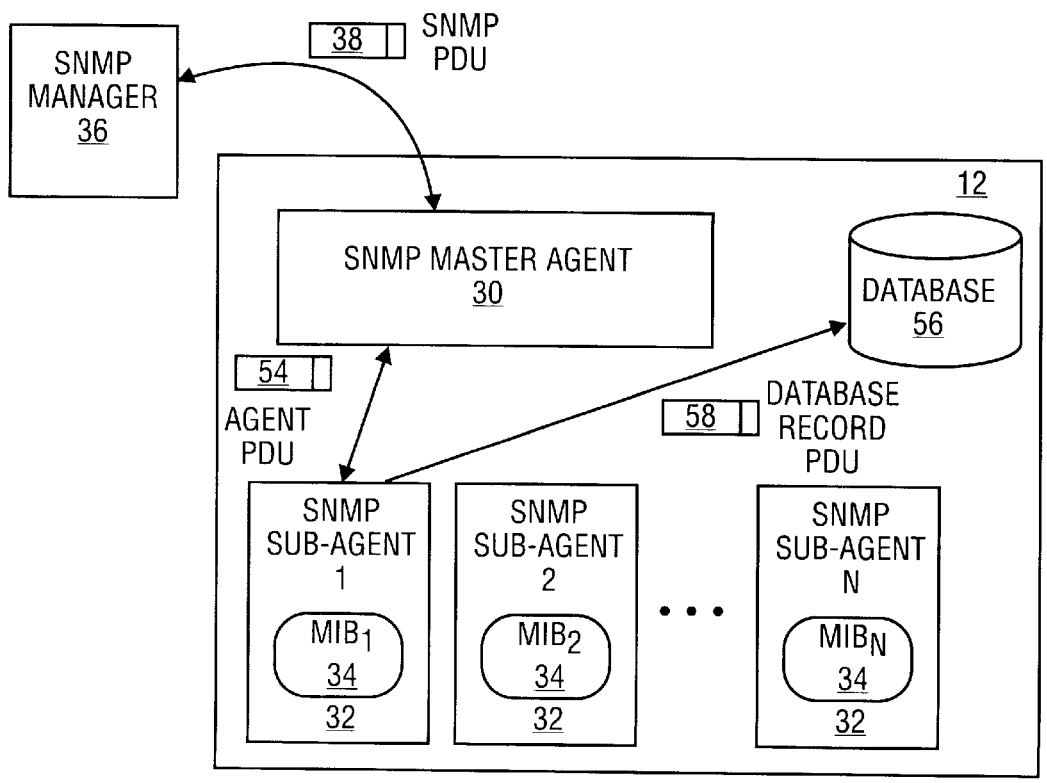
FIG. 2 illustrates a conventional distributed network controlled using an SNMP.
Figure 3:
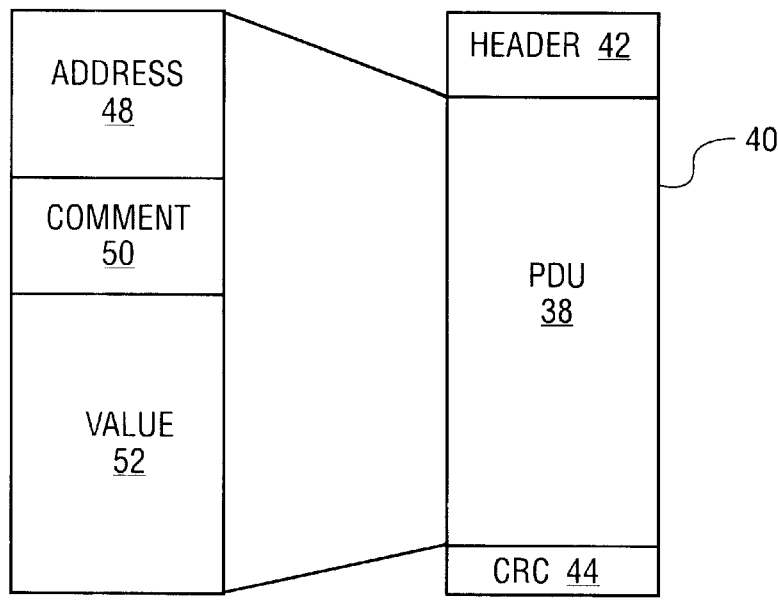
FIG. 3 illustrates a conventional SNMP protocol data unit (PDU)
Figure 4:
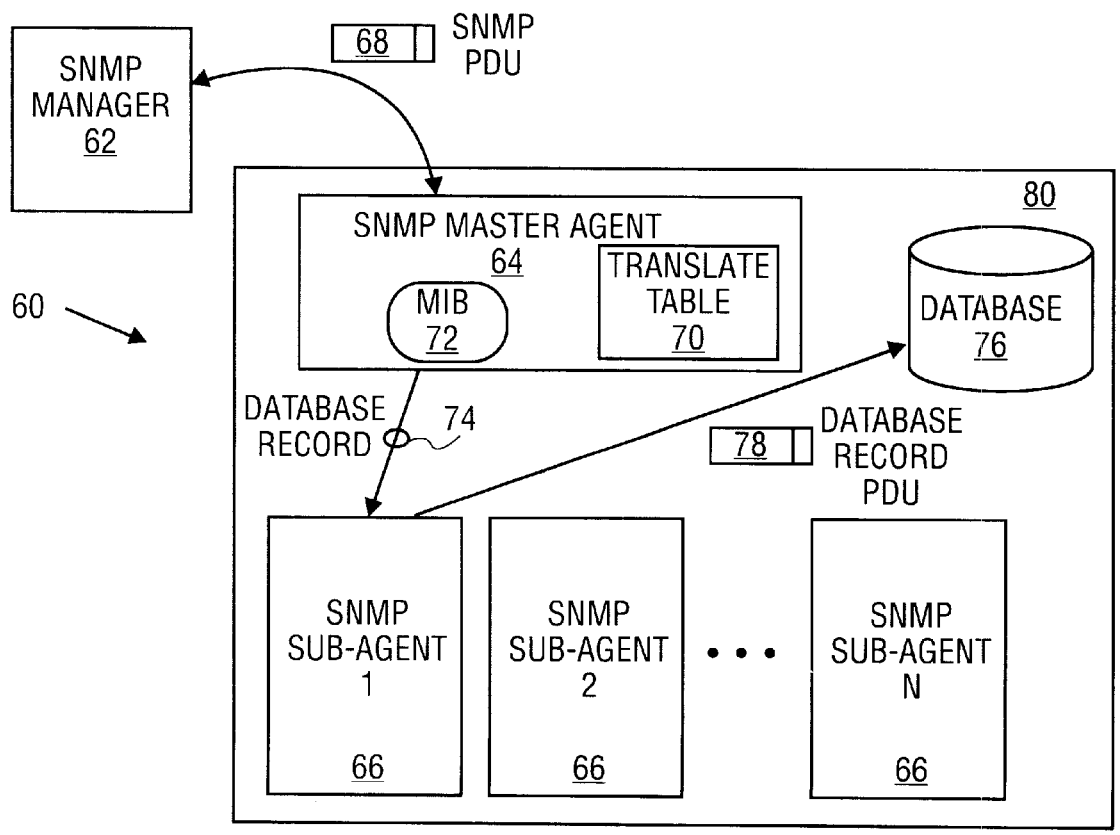
FIG. 4 illustrates a distributed network which includes an SNMP PDU translation table according to one embodiment of the present invention.

FIG. 4 illustrates a distributed network 60 which includes an SNMP translation mechanism configured in accordance with an embodiment of the present invention. Although the remaining discussion will describe the translation mechanism with reference to this implementation, it should be recognized that this is just one of a number of possible implementations for the present invention and is not meant to limit the generality thereof. An SNMP manager 62 seeking to control an SNMP master agent 64 and/or one or more associated SNMP sub-agents 66 within the network 60 transmits an SNMP PDU 68 to the SNMP master agent 62. As discussed above, the SNMP PDU 68 may comprise a header field and a data field, wherein the data field generally specifies the address of the managed object to be controlled, a command and an associated value. Unlike conventional SNMP-controlled systems, however, the SNMP master agent 64 need not reformat the SNMP PDU 68 for further processing. Instead, the SNMP PDU 68 is used to access a translation table 70 associated with the SNMP master agent 64. The SNMP master agent 64 can thereby designate the managed object (whether it is associated with the master agent 64 or one of the sub-agents 66) without the delay caused by such reformatting operation.

In one embodiment, the translation table 70 may be accessed using information from the SNMP PDU 68 data field, after the SNMP PDU 68 has been parsed. The address information contained in the data field, which generally specifies the address of the managed object to be controlled, is used to directly access an associated database record which specifies the managed object to be controlled. The database record is already in a format usable by the secondary processor system associated with the SNMP sub-agents 66, thus no additional parsing operations are required when the database record is transmitted to the sub-agent 66 associated with the managed object to be controlled. This avoids the further delay caused by such parsing operations in conventional SNMP-controlled systems.

In general then, the managed system 80 of the network 60 includes SNMP master agent 64 which comprises one or more MIBs 72. In other words, in this system, unlike conventional systems, the MIB(s) 72 reside on the primary processor system, not the secondary processor systems. The secondary processor systems (i.e., the SNMP sub-agents 66) report an SNMP MIB translation table, mapping MIB object identifiers into compressed data record elements, to the primary processor system (i.e., the SNMP master agent 64) during boot-up. The various translation tables from different sub-agents 66 may be stored individually or as a single translation table 70. Then, SNMP PDUs 68 which are transmitted from the SNMP Manager 62 to the SNMP master agent 64 are parsed and the managed object identifiers from those PDUs 68 are blindly translated into compressed data records using the translation table 70.

The data records 74 obtained from the translation table 70 (instead of an Agent PDU as in conventional systems) are provided to the secondary processor system (i.e., the SNMP sub-agents 66) where the associated SNMP service function is invoked. The sub-agents 66 return the data record, modified where necessary, to database 76, e.g., using database record PDUs 68, to be archived for later use, e.g., in the event of a reboot. The data record elements may be in the form of proprietary data record protocols, recognizable by hardware or software elements of the managed system 80, and may specify registers or other managed objects associated with the SNMP master agent 64 and/or the SNMP sub-agents 66.

Because the translation table 70 provides direct translation between MIB object identifiers and database record protocols, the SNMP master agent 64 may service SNMP Get requests from SNMP Manager 62 by directly accessing database 76. Database 76 stores the records in the proprietary format used by the secondary processor system and these records would be otherwise inaccessible by SNMP master agent 64. However, because translation table 70 provides output records in the proprietary format, the database records can be accessed directly, without the need for SNMP master agent 64 to access one of the sub-agents 66. This avoids the need to pass PDUs 68 provided by the SNMP manager 62 to and from the SNMP sub-agents 66, unless the contents of the PDU 68 will modify a value. Traps and other SNMP messages originated by the sub-agents 66 are "reverse translated" by the SNMP master agent 64 using translation table 70 from a data record format to an SNMP PDU object identifier format. Once translated, the PDU can be transmitted to the SNMP Manager 62.

Because the data record elements required for the translation table 70 can be uploaded from the SNMP sub-agents 66 to the SNMP master agent 64 at the time of boot-up, this allows the SNMP master agent 64 to update the translation table 70 as SNMP sub-agents 66 are added or deleted. Also, because the SNMP master agent 64 is required to parse the SNMP PDUs 68 from the SNMP manager 62 even in conventional systems, e.g., to determine which sub-agent the PDU is destined for, some degree of MIB knowledge is required by the master agent 64. By now moving the entire MIB 72 to the master agent 64, the MIB 72 is consolidated in one place instead of residing on two separate processor systems.

It is important to recognize that the master agent 64 does not need to understand the data record protocol format because all that is required is for the master agent to index the translation table 70, for example using the SNMP PDU 68 managed object identifier, to translate the PDU to (and from) the data record format. In general, the data record format will be more compressed and efficient than the PDU format. So, in effect, an SNMP PDU 68, having identification data for an SNMP sub-agent and an SNMP command, is received in a first format, and is translated to a second format. The identification data and command may then be transmitted, in the second format, to the appropriate SNMP sub-agent 66. When received by the SNMP sub-agent, the command may invoke a response. The translation may comprise a look-up operation wherein translation table 70 is accessed using the identification data from the SNMP PDU 68.

By implementing the present invention, only one parsing function is required for managed system 80. In other words, it is not necessary to have both an SNMP PDU parser (e.g., at the SNMP master agent level) and a data record parser (e.g., at the sub-agent level). Moreover, when the data record format is altered (e.g., during system upgrades), no modification is required for the master agent 64. Only the sub-agents 66 need be updated so that they report a different translation table at boot-up.

Thus, a distributed SNMP PDU translation mechanism has been described. Although discussed with reference to specific illustrated embodiments, however, the present invention should not be limited thereby. Instead, the present invention should only be measured in terms of the claims which follow.

What is claimed is:

1. In a system comprising a master agent communicating with a manager using a standard simple network management protocol (SNMP) format and a sub-agent communicating with an associated managed object using a sub-agent proprietary format different from the SNMP format, a method comprising:

receiving a communication at the master agent from the manager in the SNMP format; and translating the communication at the master agent on behalf of the sub-agent from the SNMP format to the sub-agent proprietary format, the translating is performed by the master agent by accessing a translation table provided by the sub-agent.

2. The method of claim 1 further comprising transmitting the communication in the sub-agent proprietary format to the sub-agent.

3. The method of claim 2 further comprising invoking a service function by said sub-agent according to the communication.

4. The method of claim 1, wherein translating further includes substituting a SNMP protocol data unit (PDU) with a database record used by the sub-agent to communicate with the associated managed object.

5. The method of claim 1, wherein the translation table is stored by the master agent.

6. The method of claim 4 wherein the master agent bypasses the sub-agent to directly access the database record of the associated managed object.

7. In a system comprising a Master Agent communicating with an SNMP manager using a simple network management protocol (SNMP) protocol data unit (PDU) format and a sub-agent communicating with an associated managed object using a database record format that is different from the SNMP PDU format, a method comprising:

receiving in the SNMP PDU format, at the Master Agent, an SNMP PDU having identification data for the sub-agent and an SNMP command for the associated managed object; and translating at the Master Agent on behalf of the sub-agent the identification data and the SNMP command from the SNMP PDU format to the Database Record format, the translating performed by the master agent by accessing a translation table provided by the sub-agent.

8. The method of claim 7 further comprising transmitting the identification data and the SNMP command in the database record format to the sub-agent.

9. The method of claim 8 further comprising invoking a service function by the sub-agent according to the SNMP command transmitted in the database record format.

10. The method of claim 7 wherein translating includes designating the associated managed object.

11. The method of claim 7 wherein the master agent bypasses the sub-agent to directly access a database record indicated by the identification data and the SNMP command contained in the database record format.

12. The method of claim 7 wherein the translation table is stored by the master agent.

13. In a system comprising a master agent communicating with a manager using a standard simple network management protocol (SNMP) format and a sub-agent communicating with an associated managed object using a sub-agent proprietary format different from the SNMP format, a method comprising:

receiving at the master agent a communication from the sub-agent in the sub-agent proprietary format; and translating the communication at the master agent on behalf of the sub-agent from the sub-agent proprietary format to the SNMP format, the translating is performed by the master agent by accessing a translation table provided by the sub-agent.

14. A method comprising;

receiving a protocol data unit (PDU) at a simple network management protocol (SNMP) master agent, the PDU in a first format, the PDU having identification data for a SNMP sub-agent and a SNMP command for an associated managed object;

accessing a translation table, the translation table provided to the SNMP master agent by the SNMP sub-agent; and using the translation table to translate the identification data from a first format to a second format.

15. The method of claim 14 further compressing transmit ting the identification data and the SNMP command in the second format to the sub-agent.

16. An apparatus comprising:

a processor; and a memory, coupled to the processor, having stored therein executable instructions which, when executed by the processor cause the processor to a) receive a protocol data unit (PDU) at a simple network management protocol (SNMP) master agent, the PDU in a first format, the PDU having identification data for a SNMP sub-agent and a SNMP command for an associated managed object, b) access a translation table, the translation table provided to the SNMP master agent by the SNMP sub-agent, and c) use the translation table to translate the identification data from a first format to a second format.

17. The apparatus of claim 16 wherein the executable instructions, when executed by the processor, further cause the processor to transmit the identification data and the SNMP command in the second format to the sub-agent.

18. A simple network management protocol (SNMP) distributed network comprising:

a SNMP manager, the SNMP manager capable of transmitting a SNMP protocol data unit (PDU), the SNMP PDU having identification data for a sub-agent and a SNMP command for an associated managed object, the SNMP PDU transmitted in a first format;

a SNMP master agent having associated therewith a translation table such that access to the translation table allows translation of the identification data and the SNMP command from the first format to a second format, the translation table provided to the SNMP master agent by the SNMP sub-agent.

19. The SNMP distributed network of claim 18 wherein the SNMP master agent transmits the identification data and the SNMP command in the second format to the sub-agent.

20. The SNMP distributed network of claim 19 wherein the first format is a SNMP protocol data unit (PDU) format and the second format is a database record format.

21. A machine-readable medium having stored thereon executable instructions which, when executed by the processor cause the processor to perform a method, the method comprising:

receiving a protocol data unit (PDU) at a simple network management protocol (SNMP) master agent, the PDU in a first format, the PDU having identification data for a SNMP sub-agent and a SNMP command for an associated managed object;

accessing a translation table, the translation table provided to the SNMP master agent by the SNMP sub-agent; and using the translation table to translate the identification data from a first format to a second format.

22. The machine-readable medium of claim 21 wherein the method further comprises:

transmitting the identification data and the SNMP command in the second format to the sub-agent.

* * * * *